(12) United States Patent
Jokela

(10) Patent No.: US 12,028,384 B2
(45) Date of Patent: Jul. 2, 2024

(54) MANAGEMENT OF A COMMUNICATION SESSION

(71) Applicant: Telia Company AB, Solna (SE)

(72) Inventor: Harri Jokela, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 16/885,372

(22) Filed: May 28, 2020

(65) Prior Publication Data

US 2020/0382563 A1 Dec. 3, 2020

(30) Foreign Application Priority Data

May 28, 2019 (FI) ...................................... 20195445

(51) Int. Cl.
*H04L 65/1069* (2022.01)
*H04L 65/1083* (2022.01)
*H04L 67/1087* (2022.01)
*H04N 7/14* (2006.01)

(52) U.S. Cl.
CPC ...... *H04L 65/1069* (2013.01); *H04L 65/1083* (2013.01); *H04L 67/1087* (2013.01); *H04N 7/147* (2013.01); *H04N 7/148* (2013.01)

(58) Field of Classification Search
CPC ............................ H04L 67/02; H04L 65/4015
See application file for complete search history.

(56) References Cited

U.S. PATENT DOCUMENTS

| | | | | |
|---|---|---|---|---|
| 9,253,809 B2* | 2/2016 | Tabatabaei Yazdi | ........................ H04W 76/10 | |
| 11,176,933 B1* | 11/2021 | Gundeti | ................ | H04L 12/282 |
| 2014/0126708 A1* | 5/2014 | Sayko | ..................... | H04L 67/22 379/93.01 |
| 2016/0028790 A1* | 1/2016 | Eriksson | ............... | H04L 65/608 709/219 |
| 2016/0337410 A1* | 11/2016 | Hancock | ................. | H04L 65/65 |
| 2018/0359366 A1* | 12/2018 | Moncomble | .......... | H04L 65/403 |

(Continued)

FOREIGN PATENT DOCUMENTS

| WO | 2016/156256 A1 | 10/2016 |
|---|---|---|
| WO | 2019/004848 A1 | 1/2019 |

OTHER PUBLICATIONS

Finnish Search Report, dated Dec. 20, 2019, from corresponding Finnish application No. 20195445.

(Continued)

*Primary Examiner* — William G Trost, IV
*Assistant Examiner* — Christopher P Cadorna
(74) *Attorney, Agent, or Firm* — NIXON & VANDERHYE

(57) ABSTRACT

Disclosed is a method for managing a communication session between a first party and a second party. The method includes: receiving a request from a web server to establish a connection; determining the second party to the connection on a basis of data received in the request; inquiring from a database at least one rule; selecting a setup for the connection with respect to the second party in accordance with the at least one rule; establishing the connection to a terminal device of the second party from the WebRTC server; attaching the connection to the terminal device of the second party with the communication session over the web page. Also disclosed is a server device, a computer program product, and a system thereto.

7 Claims, 3 Drawing Sheets

(56) References Cited

U.S. PATENT DOCUMENTS

| | | | |
|---|---|---|---|
| 2019/0044981 A1 | 2/2019 | Kielhofner et al. | |
| 2019/0306203 A1* | 10/2019 | Jokela | H04L 65/1108 |
| 2020/0053141 A1* | 2/2020 | Zhao | H04L 41/0896 |
| 2020/0250323 A1* | 8/2020 | Remington | G06F 16/972 |
| 2020/0280631 A1* | 9/2020 | Schwarzinger | H04M 3/5191 |
| 2022/0053165 A1* | 2/2022 | Maini | G06V 40/174 |

OTHER PUBLICATIONS

European Search Report, dated Jun. 30, 2020, from corresponding European application No. 20 17 6255.

* cited by examiner

MANAGEMENT OF A COMMUNICATION SESSION

TECHNICAL FIELD

The invention concerns in general the technical field of communications. More particularly, the invention concerns a solution for managing communication connection between communicating parties.

BACKGROUND

Today there exists a wide range of communication solutions suitable for different purposes. Commonly known ways of communicating are messaging, chatting, voice communication and video conference just to name few. There also exist solutions which are suitable for combining a plurality of the above listed ways of communicating. For example, an application may provide a way to establish a video conference session where live video and voice are carried, but which also enables chatting concurrently to the video conference session.

Further, a trend of digitalization has taken many services to Internet. This means that a person may access the information through a web page of a company or a service in question. Many times, the persons accessing the web page may need a real-time service even so that they remain unknown to the service provider, i.e. the company. For this kind of communication many web pages today offer a possibility to communicate with a company representative with a chat application. The web page in question may pop-up a chat window in response to the access to the web page or the person accessing the web page may activate a chat session by indicating it through e.g. an icon on the web page. The chat application offers a possibility to communicate in writing with the company representative without revealing an identity of the person.

Moreover, a person may possess a plurality of devices which may be used in a communication session, or there may occur a situation where there is a need to associate another device to a communication session established with one device.

The above described situations may be challenging to manage because the communication environment with a plurality of devices and technologies is complex. Hence, there is need to introduce solutions which enable a dynamic management of a communication session.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a server device, a computer program product and a system managing a communication session.

The objects of the invention are reached by a method, a server device, a computer program product and a system as defined by the respective independent claims.

According to a first aspect, a method for managing a communication session between a first party and a second party is provided, the method, performed by a WebRTC server, comprises: receiving, by the WebRTC server, a request from a web server to establish a connection, the web server implementing a web page maintaining a communication session with WebRTC communication capability for a terminal device of the first party; determining, by the WebRTC server, the second party to the connection on a basis of data received in the request; inquiring from a database, by the WebRTC server, at least one rule for setting up the connection to the second party; in response to a receipt of the at least one rule from the database selecting a setup for the connection with respect to the second party in accordance with the at least one rule; establishing, by the WebRTC server, the connection to a terminal device of the second party from the WebRTC server by applying a selected setup for the connection; attaching, by the WebRTC server, the connection to the terminal device of the second party with the communication session implemented by the web server with the terminal device of the first party over the web page.

The second party to the connection may be determined on a basis of an identifier representing the second party carried in the request.

For example, the identifier representing the second party may be included in an inquiry to the database.

Further, the at least one rule may comprise at least one technical parameter representing at least one capability of the terminal device of the second party for setting up the connection with the second party. The technical parameter may e.g. be at least one of the following: at least one value indicating at least one audio codec supported by the terminal device of the second party, at least one value indicating at least one video codec supported by the terminal device of the second party.

An attachment of the connection to the terminal device of the second party with the communication session implemented by the web server with the terminal device of the first party over the web page may be performed on a basis of an identifier assigned to the communications session.

According to a second aspect, a server device is provided, the server device comprising: at least one processor; at least one memory including computer program code; the at least one memory and the computer program code configured to, with the at least one processor, cause the server device to perform: receive a request from a web server to establish a connection, the web server implementing a web page maintaining a communication session with WebRTC communication capability for a terminal device of a first party; determine a second party to the connection on a basis of data received in the request; inquire from a database at least one rule for setting up the connection to the second party; select, in response to a receipt of the at least one rule from the database, a setup for the connection with respect to the second party in accordance with the at least one rule; establish the connection to a terminal device of the second party from the WebRTC server by applying a selected setup for the connection; attach the connection to the terminal device of the second party with the communication session implemented by the web server with the terminal device of the first party over the web page.

Moreover, the server device may be arranged to determine the second party to the connection on a basis of an identifier representing the second party carried in the request.

The server device may also be arranged to include the identifier representing the second party in an inquiry to the database.

The server device may be arranged to detect that the at least one rule comprises at least one technical parameter representing at least one capability of the terminal device of the second party for setting up the connection with the second party. For example, the server device may be arranged to apply as the technical parameter at least one of the following: at least one value indicating at least one audio codec supported by the terminal device of the second party, at least one value indicating at least one video codec supported by the terminal device of the second party.

The server device may be arranged to perform an attachment of the connection to the terminal device of the second party with the communication session implemented by the web server with the terminal device of the first party over the web page on a basis of an identifier assigned to the communications session.

According to a third aspect, a computer program product for managing a communication session between a first party and a second party is provided which computer program product, when executed by at least one processor of a server device, cause the server device to perform the method as defined above.

According to a fourth aspect, a system is provided, the system comprising: a terminal device of a first party; a terminal device of a second party; a web server implementing a web page; and a server device as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
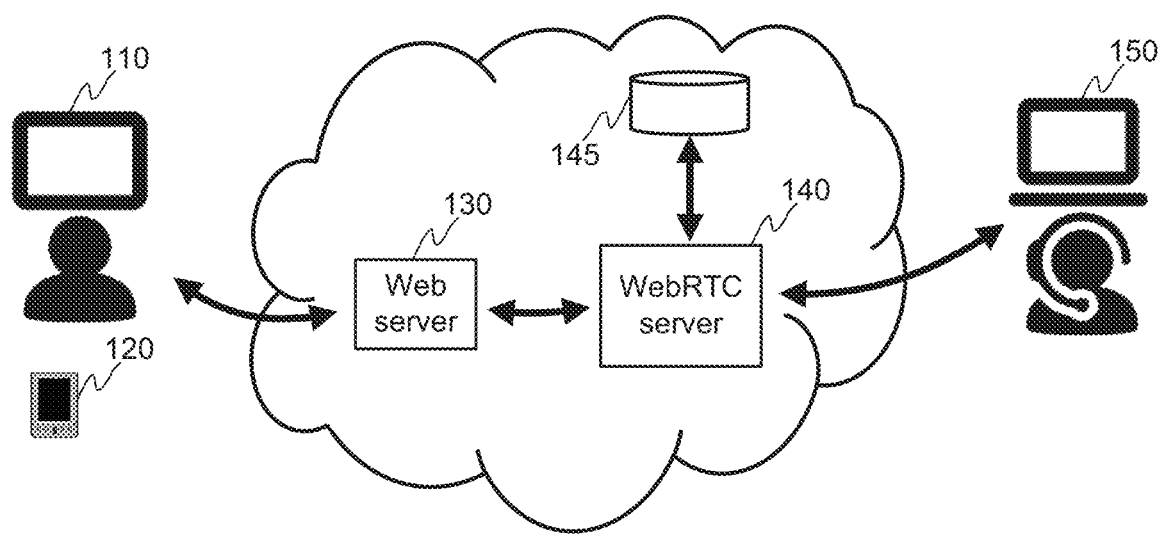
FIG. 1 illustrates schematically a communication system suitable for implementing an embodiment of the invention.

FIG. 1 illustrates schematically at least some aspects of a communication system as a communication environment implementing the present invention. There, a user may possess a plurality of terminal devices 110, 120 and in this non-limited example the user may access to Internet by using his/her terminal device 110, such as a laptop computer, a tablet computer, a mobile phone, a personal computer or any similar. For describing the present invention, it is here assumed that the user has accessed to a web page of a service provider, such as a company. The access to the web page in question may be initiated by reading a QR code or similar with the terminal device in use, which causes the access to the web page. Naturally, any other method may be used for accessing the web page. The web page may be maintained in a web server 130 accessible in Internet. A communication session may be established between the terminal device 110 of a first party and a terminal device 150 of a second party, such as a representative of the web page accessed by the user. The communication session may refer to an arrangement in which the parties of the communication session may communicate through a number of communication mechanisms, such as with messaging, with voice communication, with video communication, by sharing multimedia, and so on. The detection of the access to the web page may be performed with known mechanisms, such as identifying http-request from the terminal device 110 and any related information, such as Internet Protocol based network address. The initiation of the communication session may e.g. be arranged so that the access to the web page causes a prompting of an establishment of the communication session to the user. Alternatively or in addition, the web page may contain an icon which, by selection by the user, initiates the communication session.

In response to a detection that the first party is willing to establish the communication session the web server 130 may be arranged to generate a request to a WebRTC (Web Real-Time Communications) server 140. The WebRTC technology allows audio and video communication to work inside web pages by allowing direct peer-to-peer communication, eliminating the need to install plugins or download native applications, and, hence, it provides an attractive solution to be used in web pages for enabling a sophisticated communication solution therein. Hence, the WebRTC server 140 may receive the request from the web server 130 to establish a connection in the communication session wherein the web server 130 may implement the web page for maintaining a communication session with WebRTC communication capability for the terminal device 110 of the first party. The connection request may refer to a request to establish a voice connection with the terminal device 150 within the communication session. The request may carry data indicating a type of the connection requested and/or details with respect to the user, like an IP address or an identifier representing the user, or his/her terminal device 110 or another terminal device 120, as well as in the network, and data indicating the second terminal device 150 with whom the communication is to be established, for example. The data indicating the second terminal device 120 may e.g. be a PSTN number or ENUM identifier carried in the request. Next, the WebRTC server 140 may be arranged to perform one or more operations for setting up the connection between the communicating parties as described in the following.

According to various embodiments of the invention, the WebRTC server 140 may be arranged to determine the second party as another party to the connection on a basis of data received in the request. For example, the WebRTC server 140 may be arranged to determine an identifier representing the second party from the request. On a basis of the identifier the WebRTC server 140 may be arranged to retrieve, e.g. with an inquiry, from the database 145 at least one rule for setting up the connection to a terminal device 150 of the second party user on which information is stored in the database 145. The at least one rule may e.g. define one or more user preferences with respect to a method to establish the communication. The definition may comprise, but is not limited to, data representing one or more addresses, such as network addresses, for contacting the second party, technological parameters for establishing the connection, such as information indicating a transcoding to be used, conversion map for converting between different types of data flow (cf. audio related transcoding, or video related transcoding, traffic paths for reaching a terminal device of the second party (cf. SIP trunk or IMS), and so on. In response to the receipt of the at least one rule, the WebRTC server 140 may be arranged to establish the requested connection to the other terminal device 150, i.e. the terminal device 150 of the second party by in accordance with the at least one rule. In other words, the rule is applied for setting up the connection to the terminal device 150 of the second party. Moreover, the WebRTC server 140 may be arranged to attach the connection to the terminal device 150 with the communication session implemented by the web server 130 executed with the terminal device 110, i.e. the terminal device 110 of the first party, over the web page. As a result, the communication session may comprise a connection in which a plurality of media types is transferred in the session in accordance with the at least one rule stored in the database 145.

In the above-described manner it is possible to set up a communication session having a number of channels between terminal devices 110, 120, 150 for transferring data. The same kind of communication session setup may be performed with the other communicating party having one or more terminal devices 150 in use, and, consequently, the communication session combining necessary communication channels and terminal devices of both parties defined in the rules may be established. It may be considered that the initiation of the communication session in the web page may generate so-called video room inside the web page with the WebRTC technology into which the one or more communication channels are attached in the manner as described.

Figure 2:
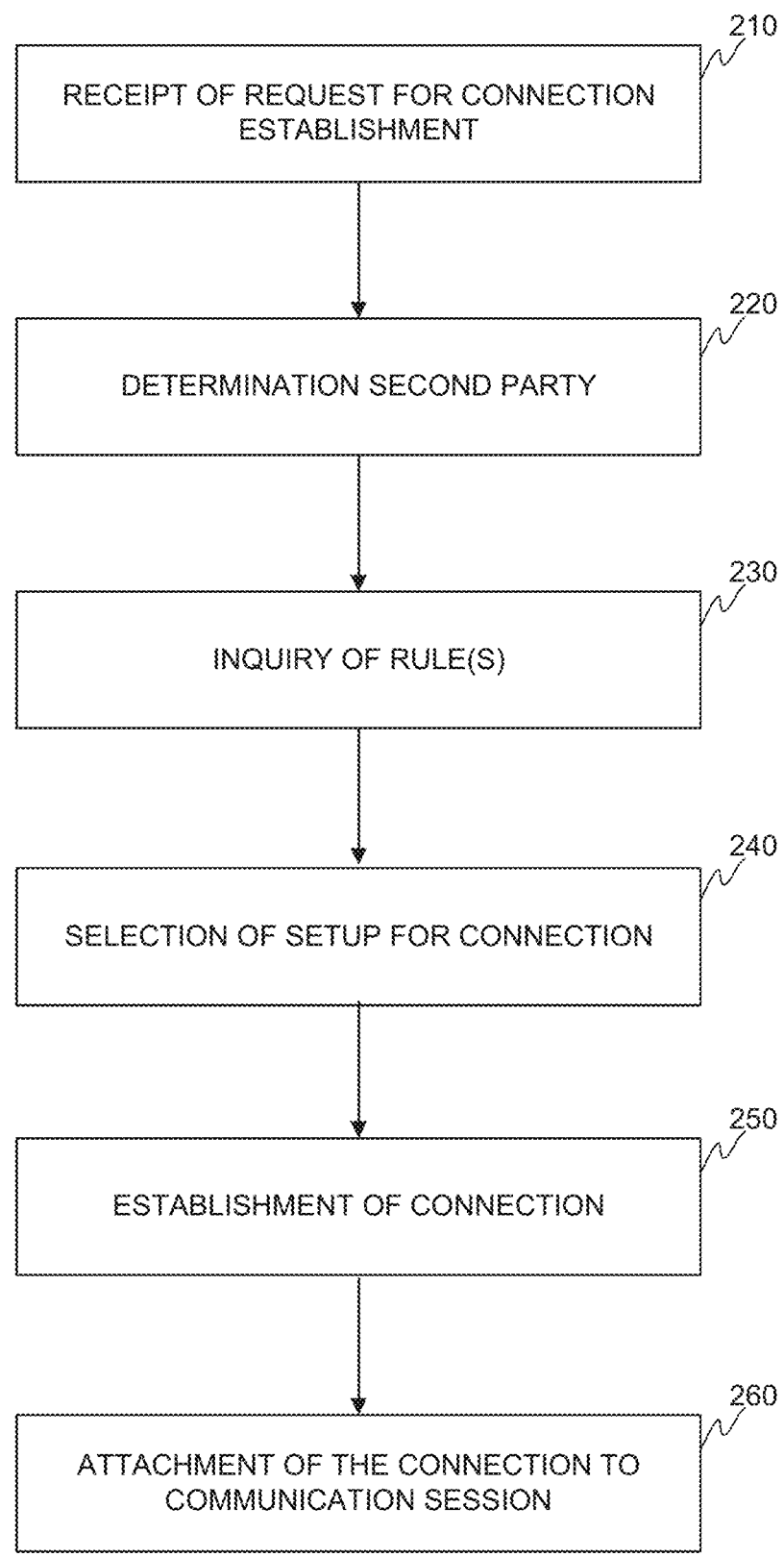
FIG. 2 illustrates schematically a method according to an embodiment of the invention.

FIG. 2 illustrates schematically a method according to an embodiment of the invention for managing a communication session. The method of FIG. 2 is disclosed from the WebRTC server 140 point of view. As discussed, a user may have accessed a web page maintained in a web server 130 with a terminal device 110, 120 of a first party. The application by means of which the access to the web page is performed with the terminal device 110, 120 may e.g. be a web browser executed by the terminal device 110, 120. In response to a predetermined action, e.g. in the manner as described above, the user may indicate that he/she is willing to establish a communication session with a party represented by the web page. In response to the predetermined action the web server 130 hosting the web page may generate a request for a connection establishment which is received 210 by a WebRTC server 140. The WebRTC server 140 to which the connection establishment request is transmitted may be defined in the web server 130 hosting the web page derivable in response to the indication received from the user through the web page. The request may carry data from which the second party of the communication may be derived either directly or indirectly. For example, the request may carry an identifier of the second party or alternatively it may carry information by means of which an identifier of the second party may be derived by the WebRTC server 140 e.g. by inquiring it from a database arranged to store user related information. In response to the receipt 210 of the connection establishment request the WebRTC server 140 may be arranged to determine 220 the second party for the communication with the data received in the request. For the connection establishment the WebRTC server 140 may be arranged to inquire 230, from the database, at least one rule for setting up a connection to the terminal device 150 of the second party, as described above. In response to the receipt of the at least one rule the WebRTC server 140 may be arranged to apply the at least one rule for selecting 240 a setup for the connection. The selection of the setup may comprise, but is not limited to, determining a number of parameters, such as technical parameters for establishing the connection. In response to the selection of the setup for connection 240 the WebRTC server 140 may be arranged to establish the connection 250 in accordance with the selected setup. Finally, in response to the establishment of the connection the WebRTC server 140 may be arranged to attach 260 the connection to the terminal device 150 of the second party with the communication session implemented by the web server 130 through the web page into which communication session the first terminal device 110 is involved, i.e. attached, to.

In various embodiments of the invention the WebRTC server may be arranged to perform operations maintaining the communicating parties anonymous to each other. This may e.g. be arranged by configuring the WebRTC server 140 to generate virtual identities to both parties and replace the real identity of a party with the respective virtual identity prior to delivering the identity information to the other party. The management of the identities may e.g. be performed by arranging a session record to the communication session in which a correspondence of the real identities and the virtual identities may maintained. In that manner the WebRTC server 140 may perform an operation hiding the real identities of the communicating parties from each other.

Figure 3:
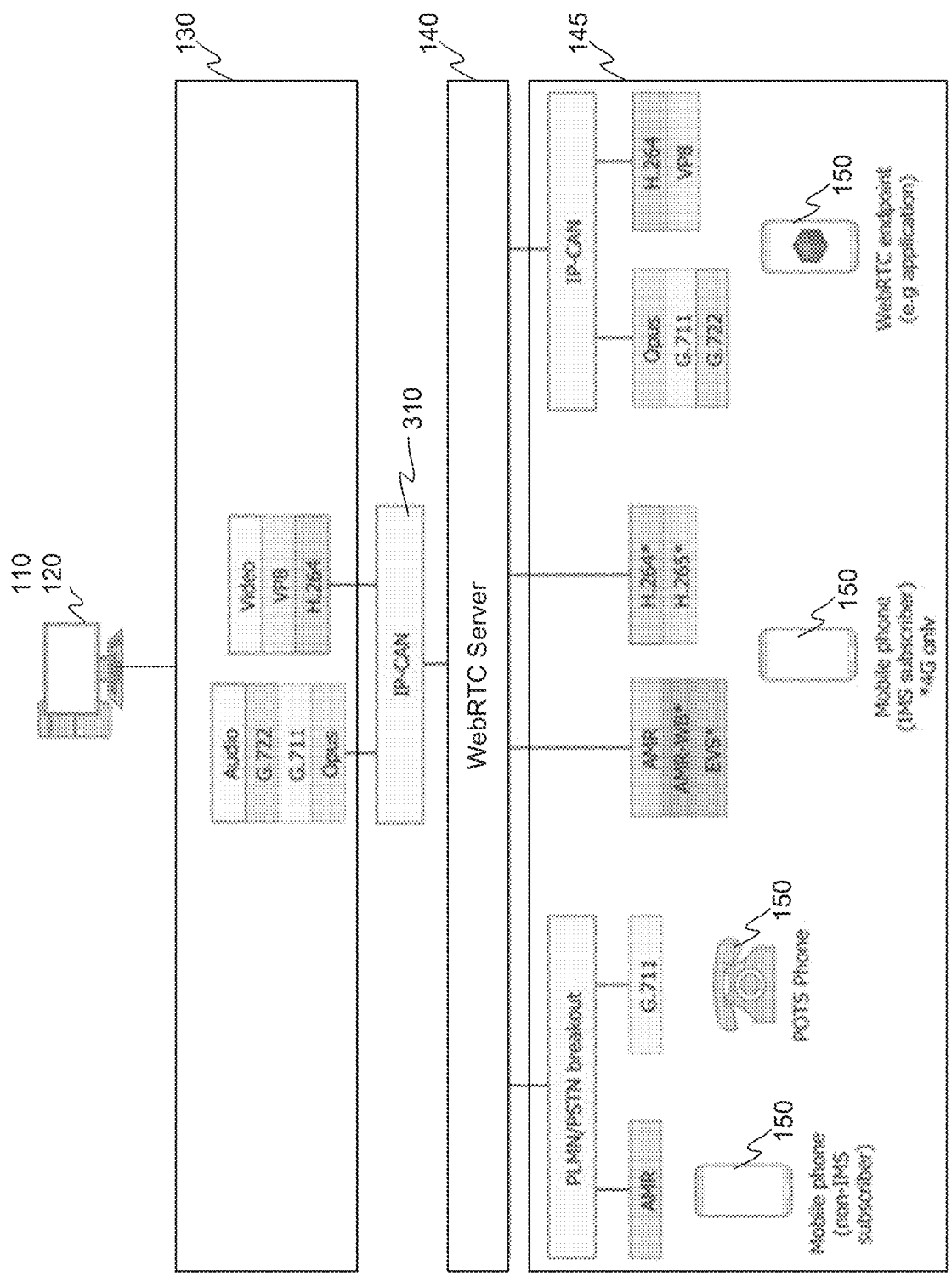
FIG. 3 illustrates schematically further aspect according to an embodiment of the invention.

FIG. 3 illustrates schematically some aspects relating to the present invention. As discussed, the terminal device 110, 120 of the first party may access to a web page hosted by a web server 130 and is willing to establish a communication session with a second party. The web server 130 may convey the request to establish the communication session to a WebRTC server 140. The network address of the WebRTC server 140 may be configured to the web server 130 e.g. accessible by a communication application executed for the establishment of the communication session. The request may be conveyed to the WebRTC server 140 over a communication network 310 named as IP-CAN (IP connectivity access network) in FIG. 3. Now, in response to the receipt of the request 210 the WebRTC server 140 may be arranged to determine 220 a second party to the communication on a basis of the data received in the request. Further, the WebRTC server 140 may initiate an inquiry to a database 145 for obtaining at least one rule for setting up the connection with the second party. The database 145 may be arranged to store data user specifically, i.e. on a communicating party based. In the non-limiting example of FIG. 3 the database 145 may store data for the second party so that the database 145 stores data defining a number of terminal devices 150 controlled by the second party which may be applied for communicating with the second party. Moreover, the database 145 may store data which defines at least some parameters representing a communication technology, e.g.

on a terminal device 150 basis, which may be used. In FIG. 3 such parameters are referred with terms "PLMN/PSTN breakout" and "IP-CAN" as well as a direct communication for certain terminal device 150. Additionally, the database may store data, e.g. in a communication technology based, what kind of audio and video data stream may be delivered per a terminal device 150 controlled by the second party. As a result, the WebRTC server 140 may inquire data with respect to a certain terminal device 150 of the second party and it may receive, as a response, at least one rule for setting up the connection to the terminal device of the second party in question. The rule may e.g. be that the second party may be reached over IP-CAN network with one of the following audio streams (codecs): Opus, G.711, G.722 and with one of the following video streams (codecs): H.264, VP8. In response to the receipt of the data from the database 145 the WebRTC server 140 may be arranged to select a setup for the connection with respect to the second party in accordance with the at least one rule. For example, the WebRTC server 140 may be arranged to evaluate optimal technological parameters, such as audio codec and video codec, for the communication session. The optimal technological parameters may e.g. be selected so that resources of the WebRTC server 140 required for hosting the communication session may be minimized. According to an example, this may refer to a selection in which the parameters are selected so that the WebRTC server 140 needs to minimize a transcoding between the connections from the first party and the second party. In an exemplifying situation the WebRTC server 140 may be arranged to select a setup which corresponds to the setup of the connection from the terminal device 110, 120 of the first party to the WebRTC server 140 over the web server 130. For example, the same audio codec and the same video codec may be applied if they are available. Hence, the attachment to the communication session may be performed accordingly. Depending on an implementation the attachment may be based on an assignment of a session identifier e.g. in response to a receipt of the request from the terminal device of the first party. The session identifier may e.g. be carried in every signaling of the solution according to the present invention in order to enable the WebRTC server 140 to manage the communication session, and its establishment.

Figure 4:
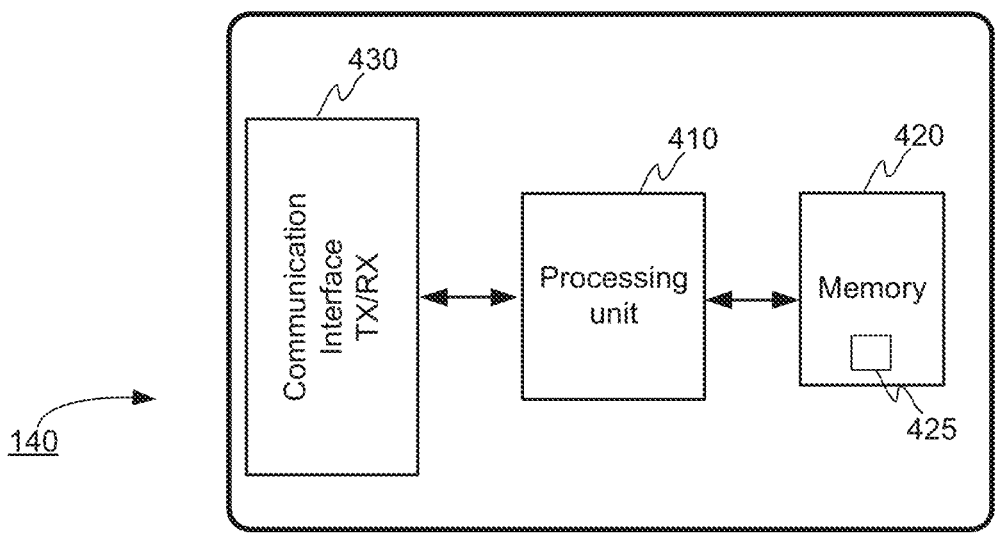
FIG. 4 illustrates schematically a server device according to an embodiment of the invention.

Some aspects of the invention relate to a WebRTC server 140 as schematically illustrated in FIG. 4. The WebRTC server 140 may be arranged to implement at least some of the method steps according to an embodiment of the invention. The server device 140 may be communicatively coupled to other entities with either wired or wireless communication technology implemented by a communication interface 430 of the server device 140. The communication interface 430 may comprise necessary hardware and software components, such as a modem, for implementing the communication. Furthermore, the server device 140 may comprise a processing unit 410 comprising one or more processors configured to generate the operational instructions causing the server device 140 to perform at least some portions of the method as described by executing portions of computer program code 425 stored in a memory 420 of the server device 140.

Furthermore, some aspects of the present invention may relate to a computer program product comprising at least one computer-readable media having computer-executable program code instructions stored therein that cause, when the computer program product is executed on a computer, such as by a processing unit 410 of a server device 140, a management of a communication session according to the method as described.

For sake of clarity the database 145 as mentioned above may be any suitable database of storing data in the manner as described. According to some embodiment the database may be so-called Home Subscriber Register (HSS) residing in a core network of a mobile communication network, for example.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for managing a communication session between a first party and a second party, the method, performed by a WebRTC server, comprising:
  receiving a request from a web server to establish a connection, the web server implementing a web page maintaining a communication session with WebRTC communication capability for a terminal device of the first party;
  determining the second party to the connection based on data received in the request including an identifier representing the second party;
  inquiring, from a database, at least one rule using the identifier representing the second party, the at least one rule comprising a communication parameter representing a communication technology that a terminal device of the second party is able to use and at least one technical parameter representing at least one capability of the terminal device of the second party to set up the connection to the second party, the at least one technical parameter in the at least one rule inquired from the database being at least one of the following: (i) at least one value indicating at least one audio codec supported by the terminal device of the second party, and (ii) at least one value indicating at least one video codec supported by the terminal device of the second party;
  in response to a receipt of the at least one rule from the database, selecting a setup for the connection with respect to the second party in accordance with the at least one rule including the communication parameter and the at least one technical parameter;
  establishing the connection to the terminal device of the second party from the WebRTC server by applying a selected setup for the connection; and
  attaching the connection to the terminal device of the second party with the communication session implemented by the web server with the terminal device of the first party over the web page,
  wherein an attachment of the connection to the terminal device of the second party with the communication session implemented by the web server with the terminal device of the first party over the web page is performed based on a session identifier assigned to the communication session.

2. The method of claim 1, wherein the identifier representing the second party is included in an inquiry to the database.

3. A server device, comprising:
  at least one processor;
  at least one memory including computer program code;
  the at least one memory and the computer program code configured to, with the at least one processor, cause the server device to:
    receive a request from a web server to establish a connection, the web server implementing a web page maintaining a communication session with WebRTC communication capability for a terminal device of a first party, determine a second party to the connection based on data received in the request including an identifier representing the second party, inquire, from a database, at least one rule using the identifier representing the second party, the at least one rule comprising a communication parameter representing a communication technology that a terminal device of the second party is able to use and at least one technical parameter representing at least one capability of the terminal device of the second party to set up the connection to the second party, the at least one technical parameter in the at least one rule inquired from the database being at least one of the following: (i) at least one value indicating at least one audio codec supported by the terminal device of the second party, and (ii) at least one value indicating at least one video codec supported by the terminal device of the second party, select, in response to a receipt of the at least one rule from the database, a setup for the connection with respect to the second party in accordance with the at least one rule including the communication parameter and the at least one technical parameter, establish the connection to a terminal device of the second party from the WebRTC server by applying a selected setup for the connection, and attach the connection to the terminal device of the second party with the communication session implemented by the web server with the terminal device of the first party over the web page, wherein an attachment of the connection to the terminal device of the second party with the communication session implemented by the web server with the terminal device of the first party over the web page is performed based on a session identifier assigned to the communication session.

4. The server device of claim 3, wherein the server device is configured to include the identifier representing the second party in an inquiry to the database.

5. A non-transitory computer-readable medium on which is stored a computer program to manage a communication session between a first party and a second party which, when executed by at least one processor of a server device, cause the server device to perform the method according to claim 1.

6. A system, comprising:
a terminal device of a first party;
a terminal device of a second party;
a web server implementing a web page; and
the server device of claim 3.

7. The method of claim 1, wherein the at least one rule defines one or more user preferences with respect to a method to establish a communication with the terminal device.

* * * * *